March 21, 1950

H. A. WAGNER ET AL 2,501,198

CLUTCH AND BRAKE DEVICE FOR
WINCH DRUMS AND THE LIKE

Filed Aug. 28, 1945

2 Sheets-Sheet 1

INVENTORS
HAROLD A. WAGNER
GUSTAVE H. WAGNER

BY

*E. A. Buchanan*

ATTORNEY

INVENTORS
HAROLD A. WAGNER
GUSTAVE H. WAGNER

ATTORNEY

Patented Mar. 21, 1950

2,501,198

UNITED STATES PATENT OFFICE 2,501,198

CLUTCH AND BRAKE DEVICE FOR WINCH DRUMS AND THE LIKE

Harold A. Wagner and Gustave H. Wagner, Portland, Oreg.

Application August 28, 1945, Serial No. 613,142

9 Claims. (Cl. 192—17)

1

This invention relates to drive mechanisms and more particularly to combined clutch and brake mechanisms suitable for use in operating cable winch drums and the like.

Drive mechanisms for winch drums usually include a clutch and a brake together with a manual control lever whereby power may be supplied to the drum, such as during hoisting, during which period the clutch is engaged and the brake released. The clutch and brake are so interconnected that upon disengagement of the clutch the brake is automatically set to hold the drum stationary. For paying out cable from the drum such as for lowering the load the operating lever is arranged for releasing the brake to such an extent as may be required. Such combined clutch and brake mechanisms as have been provided heretofore have been relatively complicated and expensive, and not suitable for use in lift trucks and the like apparatus.

It is an object of the present invention, therefore, to provide a new and improved combined clutch and brake mechanism which is particularly suitable for operating a winch drum on lift trucks and the like apparatus.

A still further object of the invention is to provide a new and improved combined clutch and brake mechanism which is adapted to be operated through a belt drive from a prime mover engine.

A further object of the present invention is to provide a new and improved clutch arrangement and operating mechanism therefor which is of a simple, inexpensive construction.

For a consideration of what is believed novel and inventive the attention is directed to the following description taken in connection with the accompanying drawings while the features of novelty will be pointed out with greater particularity in the appended claims.

Figure 3:
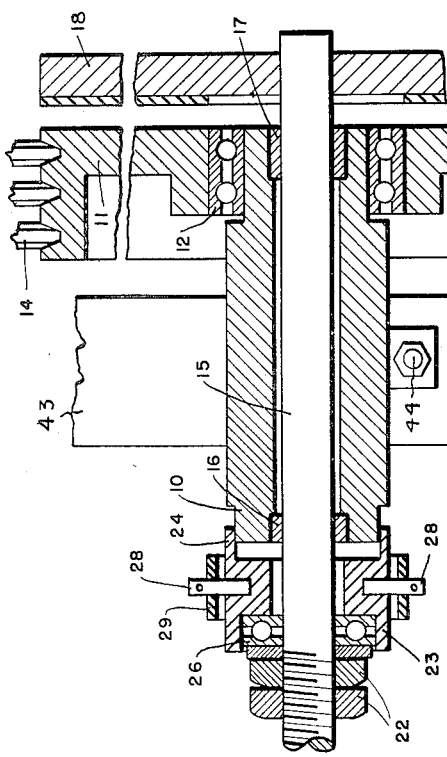
Figure 1:
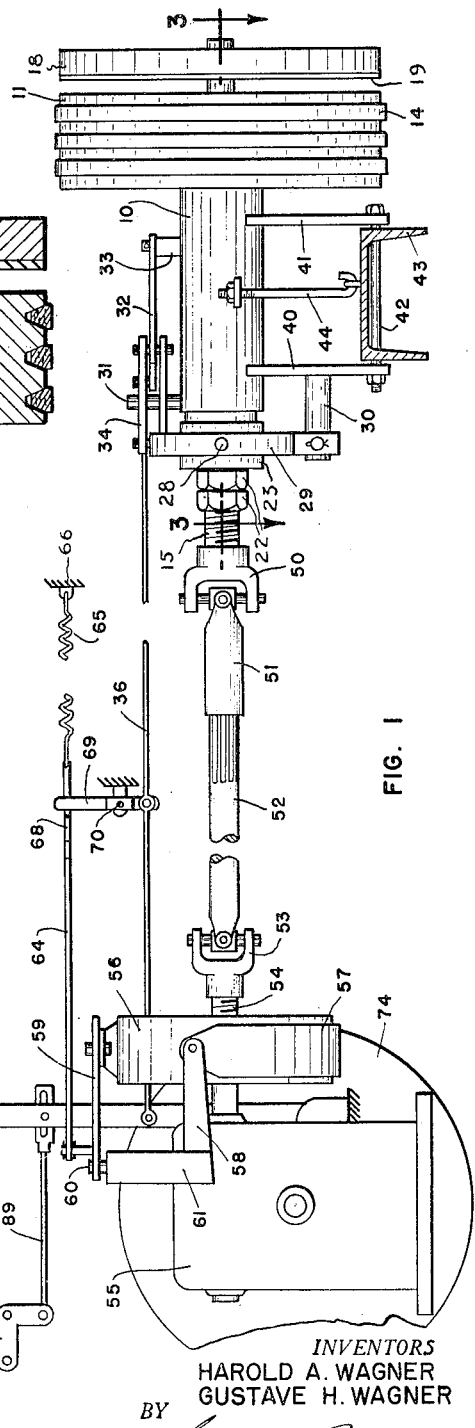
Figure 2:
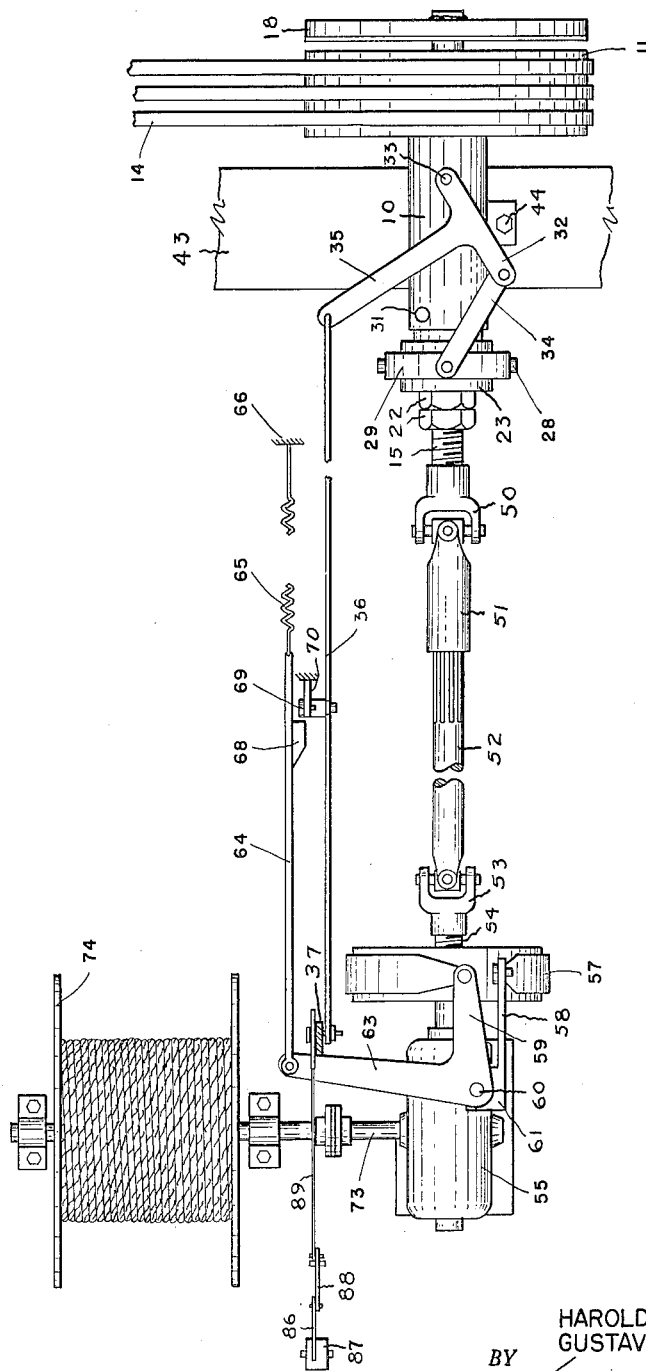

In the drawings Fig. 1 is a side elevation illustrating the invention in accordance with one embodiment thereof; Fig. 2 is a plan view of the apparatus shown in Fig. 1; and Fig. 3 is an enlarged cross-sectional view taken along the line 3—3 of Fig. 1.

In the drawings the apparatus of the invention is shown as adapted for control of a cable winch drum incorporated in a vehicle such as a lift truck in which the cable on the winch drum is connected to a load lifting element on the truck such as a load platform or a bulk material handling scoop. It will be readily understood, however, that the invention is not to be necessarily so limited in that other applications of the apparatus will be apparent to one skilled in the art.

In the drawings 10 indicates a longitudinal supporting member having a drive clutch disc 11 rotatably mounted upon one end thereof by means

2 of a ball bearing unit 12. A plurality of V-belt grooves are provided in the periphery of the cylindrical rim portion of the disc 11 for cooperatively receiving drive belts 14 extending to the prime mover engine (not shown) mounted in the vehicle. A shaft 15 extends longitudinally through the supporting member 10 concentrically with the disc 11, the shaft being journaled within suitable bearings 16 and 17 at the opposite ends of the member. A driven clutch disc 18 is rigidly secured such as by welding to the outer end of the shaft 15, the shaft 15 being axially slidable within the supporting member 10 to permit of frictional engagement between the adjacent faces of the drive disc 11 and the driven disc 18. One of the discs, such as the driven disc 18 may be provided with a facing 19 of a suitable friction material for improving the connection between the clutch elements.

Stop nuts 22 are threadedly mounted upon the shaft 15 on the opposite side of the supporting member 10 with respect to the clutch discs and an annular collar 23 is provided between the end of the member 10 and the nuts 22, one end of the collar being provided with a cylindrical extension 24 slidably arranged over the reduced diameter end portion of the member 10. The opposite end of the collar 23 is suitably recessed for receiving a thrust bearing 26 positioned between the collar 23 and the stop nuts 22. The collar 23 is provided with a pair of outwardly extending diametrically opposed pins 28 which are arranged through cooperating openings provided in the yoke member 29. The yoke 29 is pivotally supported upon the end of a fixed bracket arm 30 beneath the supporting member 10. An operating means for the yoke 29 in the form of an overcenter toggle linkage is mounted upon the upper surface of the member 10. The toggle linkage comprises a first link 32 pivotally mounted upon the upper end of stud 33 rigidly secured to the upper surface of the supporting member 10 and a second link 34 pivotally connected between the other end of the link 32 and the upper end of the yoke 29. Secured to the one of the links, such as 32 is an arm 35 which is connected by link 36 to the manual operating lever 37.

The member 10 is provided with a pair of longitudinally spaced apart depending bracket arms 40 and 41 for pivotally mounting by means of bolt 42 the clutch unit onto a suitable frame member such as the channel iron 43. The axis of the bolt 42 extends parallel with the shaft 15 and the angular position of clutch unit relative to the frame member 43 is adapted to be adjusted by means of the bolt 44 extending between channel member 43 and one side of the supporting member 10 opposite the prime mover engine. By tightening the nut on bolt 44 the clutch unit mounted upon the supporting member 10 may be swung away from the prime mover engine for effecting tightening of the belts 14. Particular attention is directed to the fact that by tightening the belts 14 no side thrust is thereby imposed upon the driven shaft 15 because the drive disc 11 is mounted by the bearing 12 directly upon the supporting member 10.

In the embodiment shown in the drawing the shaft 15 is connected through a first universal joint 50, a splined coupling 51, shaft extension 52, and a second universal joint 53, to a further shaft 54 extending from gear box 55. A brake drum 56 is mounted upon the shaft 54 having a brake band 57 arranged thereabout, one end of the band 57 being anchored to a fixed bracket 58 while the other end of the band 57 is connected to an operating lever arm 59 pivotally mounted as at 60 upon the upper end of a fixed support 61. A second lever arm 63 rigidly connected to the lever arm 59 extends adjacent the manual operating lever 37 and the outer end of the lever arm 63 is connected by rod 64 through a biasing spring 65 to a fixed support 66. By virtue of the spring 66 the brake band 57 is normally held in the set or tightened condition. Secured to the rod 64 is an off-set lug 68 which is adapted to be engaged by the end of a lever 69 pivotally mounted intermediate its ends upon a fixed support 70 and connected at its opposite end to the link 36.

Operatively coupled to the output shaft 73 of the gear box 55 is a winch drum 74 having a cable trained thereupon which is adapted to be connected to a load lifting element such as a platform, a bulk material handling scoop, or the like provided on the vehicle. When the cable on the drum 74 is connected to such a load then it will be obvious that power drive is required for operating the same only in one direction and that the brake is required for holding the load in the elevated condition or for permitting gradual lowering of the same.

The operation of the apparatus of the invention will be apparent to those skilled in the art from the description given but a few important features will be explained in greater detail. For effecting lifting of a load, that is, driving of the winch drum 74 in the forward direction the manual operating lever 37 will be shifted to the right as viewed in Fig. 1 causing a straightening of the toggle links 32 and 34 and which in turn will urge the yoke 29 and collar 23 against the stop nuts 22 to effect the frictional engagement of the faces of the clutch discs 11 and 18. If the load is to be lifted only a short distance then the operator would retain his hand upon the lever 37 and would probably not move the toggle links 32, 34 to the fully straightened condition so that by release of the lever the toggle links would automatically collapse to effect disengagement of the clutch discs and stoppage of the drum 74. If, on the other hand, the winch drum 74 is to be driven for a considerable length of time then the operator may move the manual lever 37 to its limit position carrying the toggle links 32, 34 to an over-center position where link 34 will engage with the stop pin 31 and in which position the toggle links will automatically remain until forcibly moved past center in the opposite direction to the collapsed condition. In the case of a lift truck a safety device may be provided comprising a rod 85 having a stop 86 on the upper end arranged adjacent the upper limit of travel of the load supporting carriage and which stop is adapted to be engaged by some part of the carriage such as a roller thereof indicated at 87. Upon engagement of the stop 86 by roller 87 the bell crank 88 will be turned upon its pivot and move link 89 to the left, as viewed in Fig. 1, and carry with it the manual operating lever 37 for a sufficient distance to move the toggle links 32, 34 from the over-center set position to the collapsed condition. By the provision of such a safety arrangement the winch drum 74 will be automatically stopped upon movement of the load carriage to the upper limit position upon the elevator by disengagement of the clutch.

Attention is also directed to the fact that as the manual operating lever 37 is moved to the clutch engaged position the brake band 57 will be simultaneously released through pivotal movement of the fulcrumed lever 69 which engages with the lug 68 on rod 64 connected to the operating lever arm 63 attached to the brake band. Upon disengagement of the clutch by movement of the lever 37 to the neutral position spring 65 automatically resets the brake by tightening the band 57. For paying out cable from the drum 74 the brake band 57 may be released by movement of the lever 37 to the left from the neutral position, as viewed in Fig. 1, and into engagement with the end of the lever arm 63 shifting it against the bias of the spring 65. Upon the release of the lever 37 the spring 65 will automatically retighten the brake band.

Having described the invention in what is considered to be a preferred embodiment thereof it is desired that it be understood that the specific details shown are merely illustrative and that the invention may be carried out by other means.

What we claim is:

1. A clutch mechanism comprising a supporting member, a drive disc rotatably journaled upon one end of said member, a shaft extending longitudinally through said member concentrically with said drive disc, a driven disc rigidly secured to said shaft, said shaft being longitudinally slidable within said member to cause frictional engagement between adjacent faces of said discs, a driven means, a loose coupling between said shaft and said driven means comprising a pair of longitudinally telescoping shaft members, and manual control means operatively connected to said shaft for effecting longitudinal movement thereof and telescoping movement of one of said pair of telescoping shaft members with respect to the other.

2. A clutch mechanism comprising an elongated supporting member, a drive disc rotatably journaled directly upon one end of said member, a shaft extending longitudinally through said member and mounted for rotational movement therein, a driven clutch disc rigidly secured onto the end of said shaft adjacent said drive disc, said shaft being longitudinally movable within said member for effecting frictional engagement between adjacent faces of said discs, an annular collar arranged about said shaft at the opposite end of said member with respect to said discs, a stop means secured to said shaft on the opposite side of said collar with respect to said member, a thrust bearing between said collar and said stop means, and a pivoted yoke operatively connected to said collar for causing axial shifting movement of said shaft.

3. A clutch mechanism comprising an elongated supporting member, a drive disc rotatably journaled upon the end of said supporting member, a shaft extending longitudinally through said member concentrically with said disc, a driven disc rigidly secured to the end of said shaft adjacent said drive disc, said shaft being axially movable within said member for effecting frictional engagement between adjacent faces of said disc, a stop secured to said shaft, a collar surrounding said shaft between said stop and said member, a yoke pivotally mounted at one side of said collar and operatively connected to said collar, a toggle linkage arranged on the opposite side of said shaft with respect to the pivotal mounting of said yoke, one end of said toggle linkage being connected to the adjacent end of said yoke, and an operating means connected to said toggle linkage for effecting operation thereof and for controlling axial movement of said shaft and the engagement or disengagement of said discs.

4. In a drive mechanism the combination comprising an elongated supporting member, a drive disc rotatably journaled upon one end of said member, a drive belt trained around the periphery of said disc, a shaft extending longitudinally through said member and concentrically with said disc, a driven disc rigidly secured to the end of said shaft adjacent said drive disc, said shaft being longitudinally slidable within said member for effecting frictional engagement between adjacent faces of said discs, a pivotal support for said member, the axis of said support extending parallel with said shaft, means for adjusting the angular position of said member about said pivotal support for effecting adjustment of tension of said belt, a stop secured to said shaft on the opposite side of said member with respect to said discs, a collar extending around said shaft between said stop and said member, a yoke pivotally supported at one side of said collar, a toggle linkage arranged between said member and said yoke on the opposite side of said shaft with respect to the pivotal support for said yoke, an operating lever for said toggle linkage, a brake drum mounted on said shaft, a brake band surrounding said drum, means normally holding said band in the tightened condition, said operating lever being operatively connected to said brake band whereby upon movement of said lever in one direction from a neutral position to shift said discs into the engaged condition said brake band is simultaneously released, said operating lever being operable in the opposite direction from said neutral position for effecting release of said brake band with said discs in the disengaged condition.

5. A drive mechanism comprising the combination of an elongated supporting member, a drive disc rotatably journaled upon one end of said member, a drive belt trained around the periphery of said disc, a shaft extending longitudinally through said member and concentrically with said disc, a driven disc rigidly secured to the end of said shaft adjacent said drive disc, said shaft being longitudinally slidable within said member for effecting frictional engagement between adjacent faces of said discs, a pivotal support for said member, the axis of said support extending parallel with said shaft, means connected to said member for adjusting the angular position of said member about said pivotal support for effecting adjustment of tension of said belt, a stop secured to said shaft on the opposite side of said member with respect to said discs, a collar extending around said shaft between said stop and said member, and manual control means operatively connected to said collar for effecting engagement of said discs.

6. A drive mechanism comprising the combination of an elongated supporting member, a drive disc rotatably journaled upon one end of said member, means for driving said disc, a shaft extending longitudinally through said member and concentrically with said disc, a driven disc rigidly secured to the end of said shaft adjacent said drive disc, said shaft being longitudinally slidable within said member, a stop secured to said shaft on the opposite side of said member with respect to said discs, a collar extending around said shaft between said stop and said member, a yoke connected to said collar, a manual operating lever operatively connected to said yoke for effecting longitudinal sliding movement of said shaft and for causing frictional engagement between adjacent faces of said discs, a brake drum mounted on said shaft, a brake shoe normally urged into braking condition against said drum, means operatively connecting said lever to said shoe for effecting release of said drum simultaneously with actuation of said discs into the engaged condition upon movement of said lever in one direction, said lever being operable in the opposite direction for effecting release of said brake shoe with said discs in the disengaged condition.

7. A drive mechanism comprising a clutch including a driving clutch element and a driven clutch element, a longitudinally movable shaft supporting one of said elements, means for longitudinally moving said shaft to cause engagement of said elements including an over-center toggle linkage which in the over-center straightened condition holds said elements in engagement, a brake connected to said shaft for arresting movement thereof when said elements are disengaged, a manual lever, and means interconnecting said lever with said brake and said toggle including portions operative to release said brake and engage said clutch elements when said lever is shifted in one direction from a neutral position, to engage said brake and disengage said clutch elements when said lever is placed in the neutral position, and to release said brake without affecting said clutch elements when said lever is shifted in another direction from the neutral position.

8. The structure set forth in claim 7 wherein said toggle is moved to the over-center straightened condition when said lever is shifted in the first direction from the neutral position.

9. The structure set forth in claim 7 characterized by resilient means tending to hold said lever in the neutral position.

HAROLD A. WAGNER.
GUSTAVE H. WAGNER.

REFERENCES CITED

The following references are of record in the file of this patent:

UNITED STATES PATENTS

| Number | Name | Date |
| --- | --- | --- |
| 782,481 | Borton | Feb. 14, 1905 |
| 1,265,805 | Mitchell | May 14, 1918 |
| 1,401,967 | De Voe | Jan. 3, 1922 |
| 1,949,168 | Maybach | Feb. 27, 1934 |
| 2,133,228 | Le Vesconte | Oct. 11, 1938 |
| 2,175,383 | Eason | Oct. 10, 1939 |
| 2,220,655 | Le Tourneau | Nov. 5, 1940 |
| 2,366,433 | Bridwell et al. | Jan. 2, 1945 |